United States Patent [19]
Citta et al.

[11] Patent Number: 4,876,718
[45] Date of Patent: Oct. 24, 1989

[54] SECURE DATA PACKET TRANSMISSION SYSTEM AND METHOD

[75] Inventors: Richard W. Citta, Oak Park; Paul M. Gosc, Buffalo Grove; Dennis M. Mutzabaugh; Gary J. Sgrignoli, both of Mount Prospect, all of Ill.

[73] Assignee: Zenith Electronics Corporation, Glenview, Ill.

[21] Appl. No.: 221,166

[22] Filed: Jul. 19, 1988

Related U.S. Application Data

[62] Division of Ser. No. 25,236, Mar. 12, 1987, Pat. No. 4,771,458.

[51] Int. Cl.[4] .................. H04L 9/02; H04N 7/167
[52] U.S. Cl. .................... 380/42; 380/20; 380/21; 380/43; 380/45; 380/50
[58] Field of Search .................... 380/20, 21, 42, 43, 380/45, 50

[56] References Cited

U.S. PATENT DOCUMENTS

| | | |
|---|---|---|
| 4,159,468 | 6/1979 | Barnes . |
| 4,292,650 | 9/1981 | Hendrickson .......... 380/20 |
| 4,323,921 | 4/1982 | Guillou . |
| 4,337,483 | 6/1982 | Guillou . |
| 4,354,201 | 10/1982 | Sechet et al. . |
| 4,434,322 | 2/1984 | Ferrell . |
| 4,531,020 | 7/1985 | Wechselberger et al. . |
| 4,531,021 | 7/1985 | Bluestein et al. . |
| 4,639,548 | 1/1987 | Oshima et al. .......... 380/48 |
| 4,694,491 | 9/1987 | Horne et al. .......... 380/20 |
| 4,815,130 | 3/1989 | Lee et al. .......... 380/50 |

Primary Examiner—Stephen C. Buczinski

[57] ABSTRACT

A bit packet communication system includes a head-end having a software implemented 16 bit shaft register with a plurality of feed-forward taps and a different plurality of feed-back taps for simultaneously dividing and multiplying the input data bit packet to provide an output bit packet that is both encrypted and error protected. Dynamic encryption is provided by utilizing an initial preset for the software corresponding to a preset encryption key for the shift register. Authorized subscriber terminals are provided with memories and decryption keys are downloaded. The bit packets are assembled with a global bit packet encrypted with a global encryption key and subsequent individually addressed bit packets encrypted with address keys. The address keys and terminal addresses are permanently stored in the subscriber terminal memories. The global encryption keys are changed periodically. Means are provided in each subscriber terminal for storing a number of global decryption keys which are cycled through in attempts to decrypt the global packets. One of the global decryption keys is a permanent default key associated with the subscriber terminal to assure that communication with that terminal is possible despite a lack of knowledge of the terminal address or the other global decryption keys in its memory.

12 Claims, 3 Drawing Sheets

SECURE DATA PACKET TRANSMISSION SYSTEM AND METHOD

CROSS-REFERENCE TO RELATED PATENTS AND APPLICATIONS

This application is a division of application Ser. No. 025,236, filed Mar. 12, 1987, now U.S. Pat. No. 4,771,458. This application is related to U.S. Pat. No. 4,467,353, entitled "Television Signal Scrambling System and Method" in the names of R. Citta and R. Lee issued Aug. 21, 1984, application Ser. No. 711,947, filed Mar. 15, 1985 entitled "Television Signal Scrambling Method" in the names of R. Citta, D. Mutzabaugh, and G. Sgrignoli, application Ser. No. 712,949, filed Mar. 15, 1986, entitled "Television Signal Data Transmission System", in the names of R. Citta, D. Mutzabaugh and G. Sgrignoli; application Ser. No. 025,235, filed Mar. 12, 1987 (D5443) entitled "Data Packet Encryption System Using Framing Codes", in the names of R. Citta, D. Mutzabaugh, P. Gosc and G. Sgrignoli, all of which are assigned to Zenith Electronics Corporation and all of which are incorporated by reference herein.

BACKGROUND OF THE INVENTION AND PRIOR ART

This invention relates generally to data packet communication systems and methods. It should be emphasized that while the inventions herein are described with respect to, and are particularly adapted to use with, television signal communication systems, they are not limited thereto, the inventions being equally applicable to any communications system of the data packet type. The inventions will be described in connection with a cable-connected television transmission system wherein the signals from a head-end are supplied to a plurality of subscriber terminals, connected to the head-end by a cable for controlling individual subscriber terminal decoder units. The inventive system will find particular use in a subscription television signal scrambling system including a data packet communication arrangement wherein encrypted binary data is transmitted during selected horizontal lines of the television signal. As taught in the above-mentioned patent and copending applications, television scrambling may conveniently be accomplished by suppression of the horizontal blanking signals and phase reversal of the video carrier during the blanking periods. Data may be communicated by pulse width modulation of the horizontal blanking intervals. Suppression of the horizontal sync signals scrambles the video signal such that it is rendered unviewable when received by a conventional television receiver. In order to unscramble the video display, each subscriber terminal is provided with a decoder that is operable for unscrambling the television signals and for coupling the unscrambled signals to a television receiver for viewing. Since security is a prime consideration in the design of any such system, the unscrambling technique needs to be sufficiently complex to deter would-be pirates while being capable of providing reliable decoding by authorized system subscriber terminals.

In the data packet system of the invention, four packets of 64 bits each are sequentially sent in 256 horizontal lines of the video display. The first packet is termed a "global" packet and is receivable by all subscriber terminals, whereas each of the subsequent three packets is individually addressed to a subscriber terminal and is therefore receivable only by subscriber terminals having the correct address. The global packet is used for conveying program identification "tags" for special programs, such as movie channels, and for controlling subscriber terminal decoders for pay-per-view programming. The addressed packets convey subscriber terminal authorization data and any other data that is unique to a particular subscriber terminal. Each subscriber terminal decoder includes a microprocessor and a non-volatile memory for storing an individual permanent subscriber terminal address and address key and a plurality of session keys, the purpose of which will be discussed below.

Upon receipt of a television signal, each subscriber terminal "reads" the accompanying program identification code and checks that code against its authorization memory to see if the terminal is authorized. If the terminal is authorized, the television signal is unscrambled. If the terminal is not authorized, the television signal is left unscrambled. It will be appreciated that a subscriber terminal authorization may be changed by the cable head-end by means of the addressed data packets. The terminal authorization codes are only changed when there is a change in service level, or a default in payment, and consequently, there is only a limited amount of communication that actually occurs between the head-end and any individual subscriber terminal. Thus the overwhelming majority of addressed packets are intended for the many other subscriber terminals. It is therefore an important attribute of the present inventive system, that the addressing structure is such that the microprocessor in the subscriber terminal need not spend valuable processing time on messages that are intended for other subscriber terminals. As will become apparent, the individual subscriber terminal microprocessor ignores data packets, in terms of processing, that are not intended for it. This significantly reduces the microprocessor processing time and makes for a much more efficient system.

In another aspect of the invention, the functions of message or data encryption, error protection of transmitted data and address recognition are uniquely intertwined to facilitate processing efficiency. For example, in the preferred embodiment a cyclic redundant code arrangement (CRC) is utilized for simultaneous data encryption, error protection and address recognition. This reduces processing time of the data packets since a non zero remainder in the CRC code, for any reason, results in the packet not being processed. In a still further aspect of the invention, the number of subscriber terminal addresses that may be utilized in the system, without subscriber terminal confusion, is greatly expanded with the use of address encryption keys. This is accomplished with only a slight degradation in error protection.

An important aspect of the invention is the utilization of a multibit shift register, or its equivalent software implementation, as a data encryption and error protection (DEEP) feature. The DEEP feature is preferably implemented in software at the head-end and in hardware at the subscriber terminals. The DEEP feature, as will be seen, simultaneously encrypts and error protects the data. In the head-end or encoder, the DEEP software simulates a plurality of feed-forward and feed-back taps on a multibit shift register by means of a look-up table. The DEEP feature in each subscriber terminal comprises a hardware shift register complementarily connected, that is, with feed-forward and fed-back taps interchanged as compared with those in the encoder. Further, to provide dynamic encryption, encryption and decryption "seeds" or binary presets are loaded into the DEEP software and hardware at the encoder and subscriber terminals, respectively. As will be seen, these presets comprise the session keys and address keys mentioned above. The result is a simple, secure, readily implemented data packet transmission system.

OBJECTS OF THE INVENTION

A principal object of the invention is to provide a novel data packet transmission system.

Another object of the invention is to provide a data packet transmission system and method that simultaneously provides data encryption and error protection.

A further object of the invention is to provide a data packet transmission system and method utilizing novel addressing techniques.

A still further object of the invention is to provide a novel method of operating a data packet transmission system.

Still another object of the invention is to provide a data packet transmission system in which the available subscriber terminal addresses may be readily expanded.

BRIEF DESCRIPTION OF THE DRAWINGS

These and other objects and advantages of the invention will be apparent from reading the following description in conjunction with the drawings, in which.

DESCRIPTION OF THE PREFERRED EMBODIMENT

Figure 1:
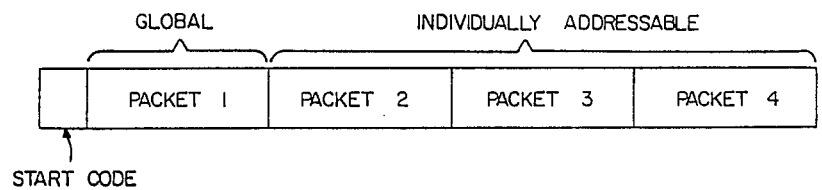
FIG. 1 illustrates the arrangement of the binary data packets in the system of the invention.

Referring to FIG. 1, the arrangement of data packets in accordance with the invention is diagrammatically shown. Initially, a start code of any suitable form may be utilized to initialize apparatus in each subscriber terminal to make it ready for the reception of data. Immediately following the start code, a global data packet or packet 1 is sent followed in sequence by individually addressed data packets 2, 3 and 4. In the system of the preferred embodiment, each packet consists of 48 bits of "data" and 16 bits of CRC code. The start code may be any form of "framing code" and, in accordance with the preferred embodiment, is sent during the vertical blanking interval of the television signal. The start code may, for example, take the form of a framing code as taught in copending application Ser. No. 025,235. However, the type of start code employed forms no part of the present invention. As mentioned, the global packet comprises data that is intended for receipt by all of the subscriber terminals, e.g., program identification tags identifying the accompanying TV program, while the individually addressed packets comprise data intended to be received by only the addressed subscriber, e.g. subscriber authorization levels.

Figure 2:
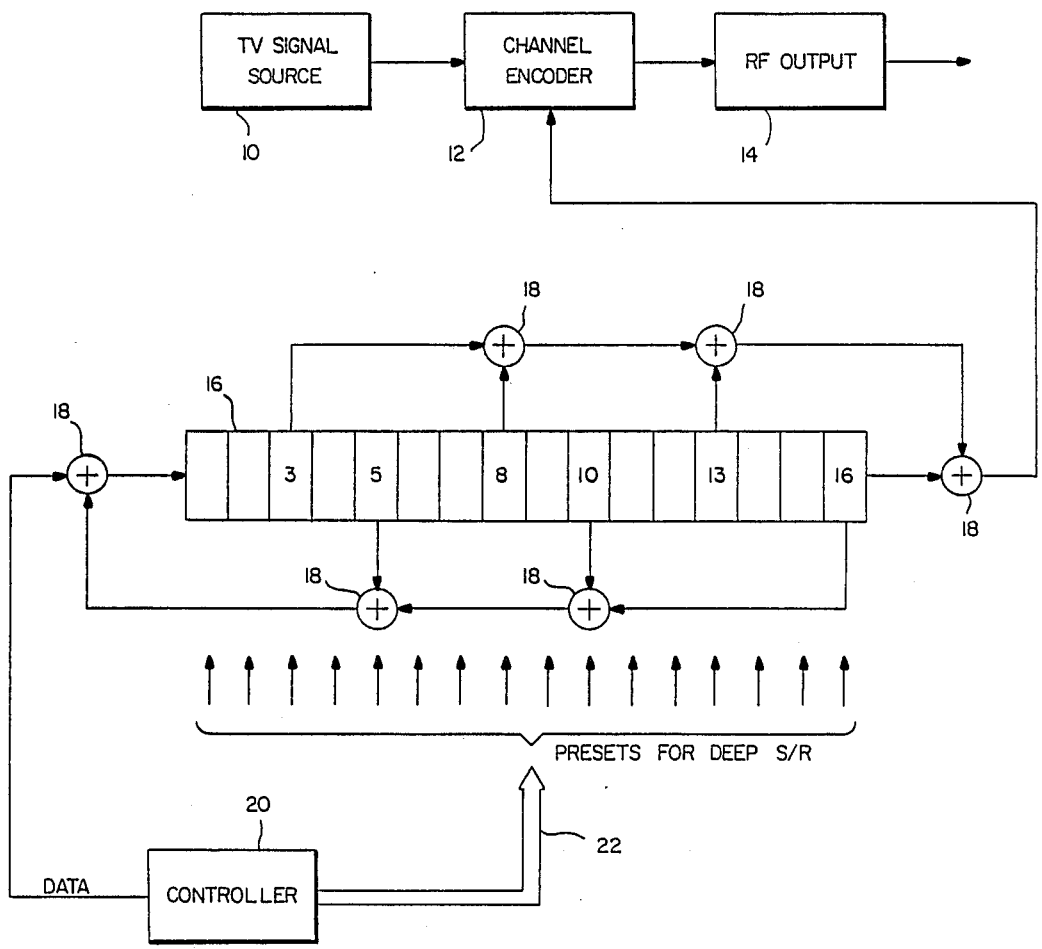
FIG. 2 is a partial block diagram of a head-end or encoding system for formatting the binary data packets in accordance with the invention as implemented in hardware.

In FIG. 2, a television (TV) signal source 10 is coupled to a channel encoder 12 that, in turn, supplies an RF output 14. The TV signal source may provide a conventional television signal that is scrambled by encoder 12 and transmitted with data signals including a program tag for enabling previously authorized terminals to render the scrambled TV signal viewable.

The data signals are supplied to encoder 12 by a processor simulating in software a 16 bit shift register 16, which is diagrammatically shown with certain identified bits connected in a feed-forward and feed-back arrangement. For example, bits 3, 8 and 13 are added, or summed, through individual summation circuits 18 with the output of shift register 16. Similarly, bits 5, 10 and 16 are summed through other individual summation circuits 18 in a feed-back arrangement with the input of shift register 16. The summation circuits 18 may be exclusive OR gates. With the arrangement, data from a controller 20 is supplied to the input of the shift register and is simultaneously encrypted and error protected in its passage therethrough. In the example selected, 48 bits of data at the input of shift register 16 and 16 zeros results in a 64 bit data stream at the output which is applied to channel encoder 12. This corresponds to 48 bits of data and a 16 bit redundant code. Channel encoder 12 includes well-known means for formatting this data in packets as shown in FIG. 1. By means of communication channel 22, controller 20 supplies presets for the DEEP shift register 16. For the global packet, the preset corresponds to a session key that serves to further dynamically encrypt the data passed through shift register 16. For addressed packets 2, 3 and 4, the presets comprise address keys as determined by the controller 20. All of the data is combined with the TV signal which is scrambled in channel encoder 12 and applied to RF output 14 where it is transmitted along the cable to the various subscriber terminals.

It will be appreciated that in most instances, not all of the channels supplied by the cable head-end will carry data communications. Therefore the data will be periodically transmitted to insure that all subscriber terminals have an opportunity to receive it. In many installations, a subscriber terminal is automatically tuned to a "homing" channel when not in use and the cable head-end may utilize that channel for downloading data or communicating with the subscriber terminal.

Figure 3:
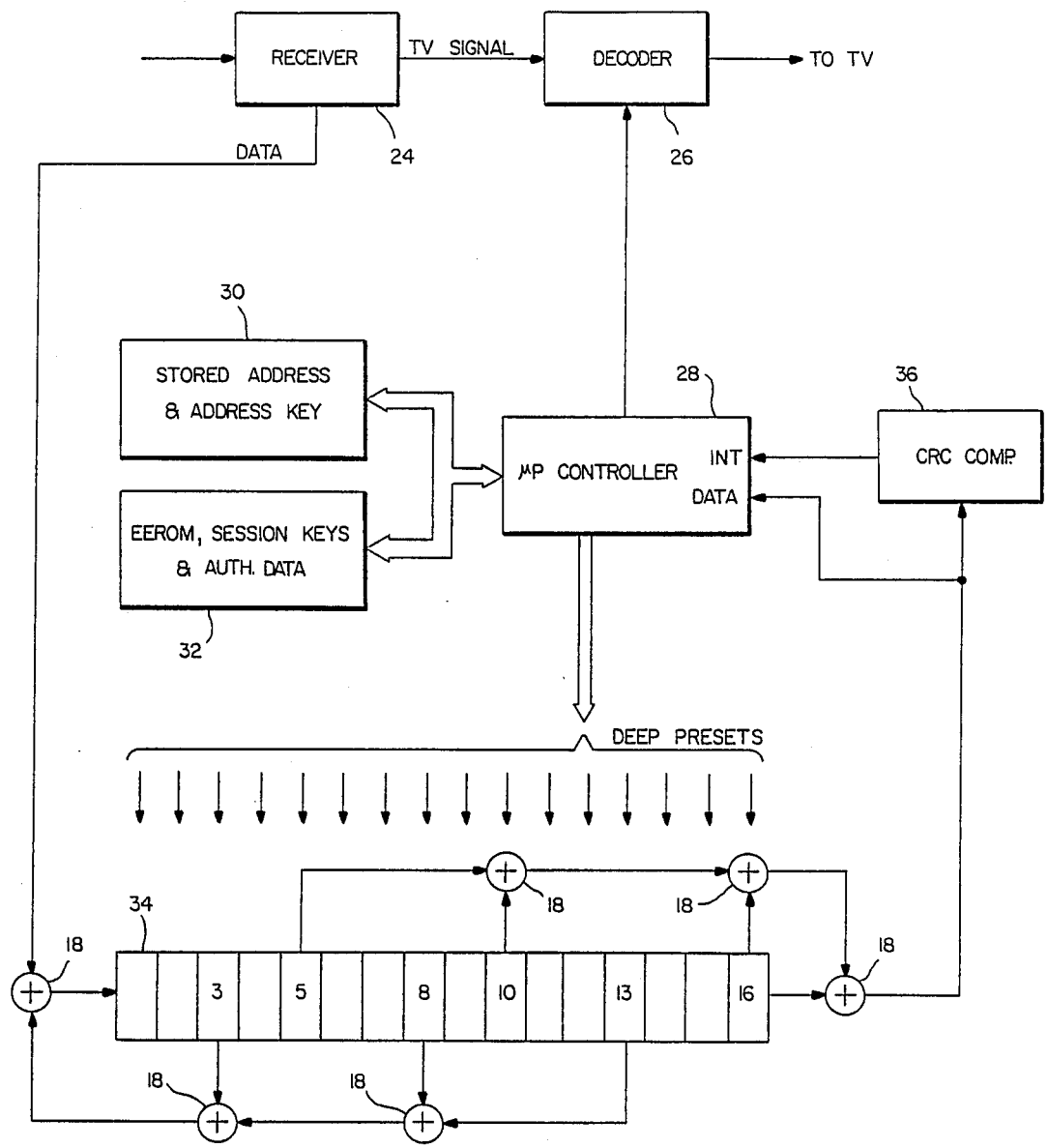
FIG. 3 is a block diagram of a subscriber terminal for receiving and decoding data packets encrypted in accordance with the invention.

In the subscriber terminal of FIG. 3, the receiver 24 accepts the incoming transmission from the head-end, sends the scrambled TV signal on to a decoder 26 and removes the encrypted and error protected data which is applied to a 16 bit shift register 34 that has complementarily connected feed-forward and feed-back taps to those of the head-end 16 bit shift register. Thus, positions 5, 10 and 16 of the DEEP circuit shift register 34 are coupled through summation circuits 18 in a feed-forward arrangement whereas positions 3, 8 and 13 are connected in a feed-back arrangement. It should thus be apparent that data sent through the DEEP shift register 16 of the encoder will be decrypted by being passed through DEEP shift register 34 of the decoder, provided however, that the presets utilized for the encoder DEEP shift register are also utilized for the decoder DEEP shift register. The presets for DEEP shift register 34 are applied by microprocessor based controller 28 which is shown with access to a pair of memories. Memory 30 is for storing the address and address key for the particular subscriber terminal. The address and address keys are permanent and "burned into" the memory at the factory. Memory 32, on the other hand, is preferably an EEROM and is utilized to store the session keys and the authorization data that is downloaded from time to time to the subscriber terminal from the cable head-end by means of the individually addressed packets. Memory 32 is electrically alterable to store different session keys and different authorization data.

In accordance with one aspect of the invention, one of the session keys is a "default" key that is permanently set in memory 32 of the subscriber terminal. The subscriber terminal automatically searches through the session keys stored in its memory when trying to decrypt a global packet. If the subscriber terminal is not an authorized one in the system, its session keys will never match the key used to form the global packet, and it will never become operable. If, on the other hand, an authorized subscriber terminal is in the factory or is brought in for service, the default session key may be used to communicate with the terminal.

The output of DEEP shift register 34 is supplied to a DATA input of controller 28, and also to a CRC comparator 36 which is coupled to the interrupt (INT) input of the microprocessor controller 28. While the data in each packet is loaded into the memory of microprocessor 28, no processing of the data occurs until an interrupt signal is received when the 16 bit remainder of the CRC comparator is all zeros.

Figure 4:
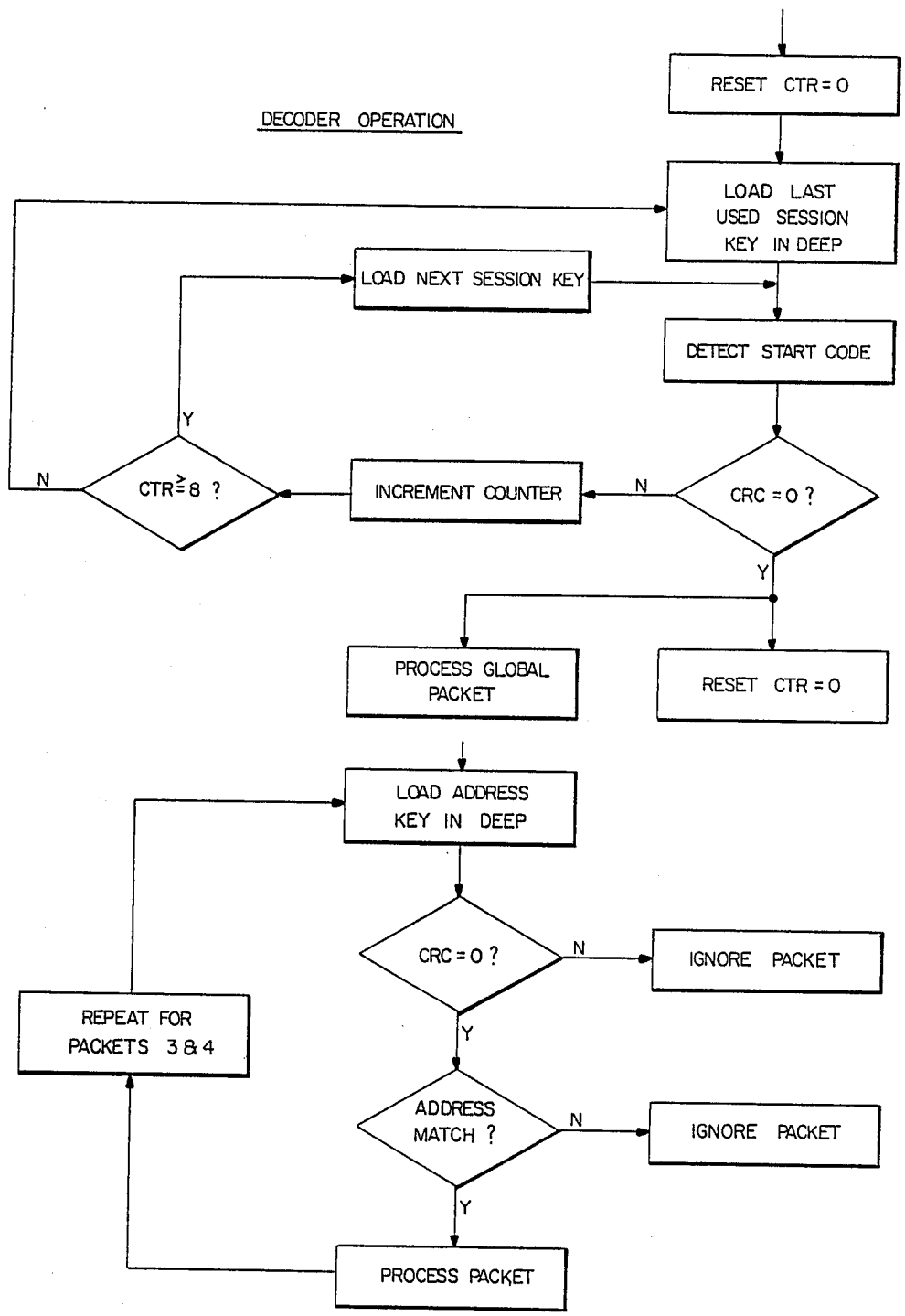
FIG. 4 is a pair of flow charts illustrating decoder operation in a subscriber terminal.

Reference to FIGS. 2 and 3 and to the flow chart in FIG. 4 will be helpful in explaining operation of the system. As mentioned, the data is formulated into packets by the system controller and applied to the channel encoder by the DEEP shift register. The encoder combines the data with a TV signal from the TV signal source, scrambles the TV signal and passes the scrambled signal and data to a modulator for transmission to the various subscriber terminals. The DEEP shift register in the head-end encrypts the data by dividing it by a polynomial whose coefficients are represented by the feed-back taps on the 16 bit shift register. Simultaneously, error protection is achieved by multiplying the data by a different polynomial whose coefficients are represented by the feed-forward taps of the shift register. The polynomial is represented by a session key (global packet) and by an address key (addressed packet), the address key corresponding to the stored address key of the addressed subscriber location. Obviously, in a preferred embodiment, each feed-forward tap for a session key or an address key is different from any feed-back tap. Data packet error protection and data encryption are thus performed simultaneously in the DEEP shift register (or its software equivalent). For purposes of explanation they may be considered separately.

In terms of error protection, 48 bits of data for each packet are applied to DEEP shift register 16 by the controller 20 and the DEEP shift register multiplies these 48 bits of data by a polynomial whose coefficients are represented by the feed-forward taps of the shift register. The output is thus a 64 bit packet comprising 48 error protected bits and a 16 bit redundant code. Assuming that this output is processed in a subscriber terminal by dividing it by the same polynomial in a complementary DEEP shift register, the division will result in a 16 bit remainder which will be all zeros, provided there are no errors in the packet.

Encryption of the data is performed by dividing the data bits from the controller 20 in the DEEP shift register 16 by a polynomial represented by the feed-back taps of the shift register. Decryption is accomplished in a subscriber terminal by multiplying each encrypted package by the same polynomial in a complementary DEEP shift register.

As mentioned, data encryption is facilitated by using an encryption seed or key to preset the shift register. For the global packet, the key is referred to as the session key and is common to all subscriber terminals. The session key may be changed from time to time, e.g. on a monthly basis. For the addressed packets, the key is referred to as an address key and may be different for each subscriber terminal or may be common to a group of subscriber terminals. The combination of the address key and the subscriber terminal address uniquely defines a subscriber terminal. Each global packet is encrypted by presetting the DEEP shift register 16 with the current session key and each addressed packet is encrypted by presetting the DEEP shift register 16 with the address key corresponding to the intended subscriber. (The subscriber terminal address information is included in 24 of the 48 bits of the packets.) In practice, the session keys are downloaded to each system subscriber terminal as part of an addressed packet as is other authorization data.

With particular reference to the flow chart, initially a counter in the subscriber terminal is reset to zero. The previously used session key is loaded into the subscriber terminal DEEP shift register, the start code is detected and the resulting CRC code (i.e. the 16 bit remainder of the processed packet) for the global packet is checked. If the CRC code matches (remainder of all zeros), it is presumed that the session key is correct and that there are no errors in the data. At that point, the counter is reset to zero and the global packet is processed for any general information therein, that is, information that is applicable to all subscriber terminals. Next the terminal address key is loaded into the DEEP shift register for processing the first received addressed data packet. Again the CRC is checked. If the CRC code is not all zeros, the packet either is addressed to a different subscriber terminal or there are errors in it. In either event, the packet is ignored. If the CRC code shows all zeros, an address comparison is made in the subscriber terminal controller to see if indeed the packet is meant for that subscriber terminal. If the address comparison shows a mismatch, the packet is ignored. If the address comparison shows a match, the packet is processed by the microprocessor and the procedure is repeated for the next two addressed packets. It is thus seen that the microprocessor only processed packets that are intended for it.

As mentioned, the session keys are generally changed on a periodic basis. Since the subscriber terminal needs the session key in order to process global data packets, the system provides for a number of attempts to match a session decryption key in the subscriber terminal memory to the session encryption key used in the global packet. Thus, if the CRC code for a received global packet does not yield a zero result, and if there are no other error flags or indications in the system, the counter is incremented and the current session description key is used again to attempt to decrypt the next global packet. If failure results again, and there are no other error flags, the counter is incremented again and another attempt is made to decrypt the global packet with the same session key. This continues until the counter is incremented to 8 at which time a new session decryption key is loaded and the process repeated with the different session decryption key. Decryption with the new session key is attempted only once. Should that session key also fail, another session key in memory is tried, etc. The default session key, that is, the session key that is permanently stored within the subscriber terminal is also included in the search process. This process continues in an attempt for the subscriber terminal to establish communication with the head-end. When decryption yields a zero result, the counter is reset and the global packet is processed. If the subscriber terminal is not an authorized terminal for that system, however, it never gets a correct session key downloaded to it and it never becomes operable in the system. (When a subscriber terminal is added to a system, its address is placed on an "install list" and the head-end periodically transmits addressed information for downloading proper session keys and authorization codes to it). Also, for subscribers who do not pay, the new session keys need not be downloaded to their terminal memories, which effectively deauthorizes the terminals.

Another aspect of the invention resides in the intertwining of the address decryption key, the address and the CRC code. With a 24 bit address there are 16,000,000 unique subscriber terminal addresses available. By using 16 bits as address description keys, the number of unique subscriber terminals that can be addressed may be increased to a maximum of $2^{40}$ with a nominal 24 bit address. This expansion involves assigning the same addresses to a number of subscriber terminals, each of whom has a different address decryption key. The disadvantage is that the degree of error protection for the subscriber terminals with the same address is decreased. However, it can be shown that the possibility of addressing unintended subscriber terminals, considering the probabilities of two subscriber terminals having the same address being on the same system, is remote. Consequently, the practical effect of expanding the subscriber terminal addresses as above-described is a nominal decrease in error protection between subscriber terminals with the same address.

It is recognized that numerous changes in the described embodiment of the invention will be apparent to those skilled in the art without departing from its true spirit and scope. The invention is to be limited only as defined in the claims.

What is claimed is:

1. A method of operating a data packet communication system comprising the steps of:
   formatting data into binary data packets;
   processing said binary data packets by division and multiplication by different factors to simultaneously encrypt and error protect said binary data packets; and
   transmitting the processed binary data packets.

2. The method of claim 1, further including the steps of:
   receiving said data packets; and
   processing the received binary data packets by division and multiplication by complementary factors to said different factors to simultaneously decrypt and error detect the packets.

3. The method of claim 2, further including the step of:
   selectively changing the effective value of said different factors.

4. A data packet communication system comprising:
   formatting means for formatting data into binary data packets;
   encryption means coupled to said formatting means for dividing and multiplying said binary data packets by different factors to simultaneously encrypt and error protect said binary data packets; and
   means for transmitting the encrypted-error protected binary data packets.

5. The system of claim 4 wherein said encryption means comprise software that is functionally equivalent to a multi-bit shift register having feed-forward and feed back connections that differ from each other.

6. The system of claim 5, wherein said software is preset to an initial state that is functionally equivalent to presetting said shift register with an encryption key.

7. The system of claim 6 wherein said binary data packets each include 48 binary bits and wherein said encryption means adds a 16 bit CRC code to said binary data packets.

8. A data packet communication system comprising:
   formatting means for formatting data into binary data packets of 64 bits;
   software encryption means for dividing and multiplying said binary data packets to simultaneously encrypt and error protect said binary data packets, said software encryption means being functionally equivalent to a 16 bit shift register having a plurality of feed-forward and feed-back connections that differ from each other;
   means for presetting said software to an initial state with an encryption key; and
   means for transmitting said encrypted binary data packets.

9. The method of claim 3 wherein said changing step comprises encoding said data packets in accordance with a selectively changeable preset value.

10. The method of claim 9 including the steps of passing said received data packets through a multi-bit shift register having feed-forward and feed-back connections corresponding to said complementary factors and presetting said shift register with said preset value prior to said processing step.

11. A method of operating a data packet communication system comprising the steps of:
   formatting data into binary data packets including a message portion and a code portion;
   processing said binary data packets by division and multiplication by different factors to simultaneously encrypt and error protect said binary data packets;
   transmitting said processed binary data packets;
   receiving said transmitted binary data packets;
   processing received binary data packets by division and multiplication by factors complementary to said different factors to simultaneously decrypt and error detect said binary data packets; and
   determining whether said predetermined code portion was altered during transmission.

12. A data packet communication system comprising:
   formatting means for formatting data into binary data packets of a given number of bits including a message portion and a predetermined code portion;
   encryption means for effectively dividing and multiplying said binary data packets to simultaneously encrypt and error protect said binary data packets by different factors, said encryption means being functionally equivalent to a multi bit shift register having a plurality of feed forward and feedback connections that differ from each other;

means for transmitting said encrypted binary data packets;
means for receiving and for processing received binary data packets by effectively dividing and multiplying by factors complementary to said different factors to simultaneously decrypt and error detect said binary data packets; and
means for determining whether the predetermined code portion was altered in transmission.

* * * * *